United States Patent
Akanuma et al.

(10) Patent No.: US 6,442,466 B1
(45) Date of Patent: Aug. 27, 2002

(54) MANUAL OPERATION CONTROL OF AUTOMATIC TRANSMISSION

(75) Inventors: Masatoshi Akanuma, Fujisawa; Mitsuru Watanabe, Hadano; Masato Koga, Atsugi; Satoshi Takizawa, Yokohama; Shigeki Shimanaka, Hadano; Hiroyasu Tanaka, Zama; Junya Takayama, Oomiya, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/691,851

(22) Filed: Oct. 18, 2000

(30) Foreign Application Priority Data

Oct. 18, 1999 (JP) .......................................... 11-295654

(51) Int. Cl.$^7$ ................................................. G06F 7/00
(52) U.S. Cl. .............................. 701/51; 701/52; 701/55; 701/64; 701/66; 477/132
(58) Field of Search .............................. 701/51, 52, 55, 701/61, 64, 66; 475/153; 477/132; 74/333, 336 R

(56) References Cited

U.S. PATENT DOCUMENTS

| | | | | |
|---|---|---|---|---|
| 4,414,863 A | * | 11/1983 | Heino | 74/866 |
| 4,740,898 A | * | 4/1988 | McKee et al. | 701/70 |
| 4,838,126 A | * | 6/1989 | Wilfinger et al. | 477/129 |
| 5,305,657 A | * | 4/1994 | Bray et al. | 74/336 R |
| 5,823,052 A | | 10/1998 | Nobumoto | 74/335 |
| 6,067,492 A | | 5/2000 | Tabata et al. | 701/51 |
| 6,292,731 B1 | * | 9/2001 | Kirchhoffer et al. | 701/55 |

FOREIGN PATENT DOCUMENTS

| | | |
|---|---|---|
| DE | 43 11 886 | 10/1994 |
| EP | 0 519 528 | 12/1992 |
| EP | 1 043 521 | 10/2000 |
| JP | 10-100723 | 4/1998 |
| JP | 10-329568 | 12/1998 |
| JP | 11-99840 | 4/1999 |

* cited by examiner

Primary Examiner—Gertrude Arthur
(74) Attorney, Agent, or Firm—Foley & Lardner

(57) ABSTRACT

A first switch (2) which can select a manual mode, and a second switch (5, 6) which can select one of an upshift and a downshift, are provided. A microprocessor (1) varies a speed ratio of an automatic transmission (10) according to the specification of the second switch (5, 6) when the first switch (2) has previously selected the manual mode, and the second switch (5, 6) subsequently specifies one of the upshift and the downshift (S20, S21, S33, S40, S41, S34, S36, S37, S53, S54, S55). On the other hand, variation of the speed ratio of the automatic transmission (10) according to the specification of the second switch (5, 6) is prohibited when the second switch (5,6) specifies one of the upshift and the downshift at a timing not later than a timing at which the manual mode is selected by the first switch (2) (S20, S22, S33, S40, S38, S34, S36, S38, S53, S54, S56). Due to this processing, an unexpected speed ratio variation is prevented from occurring simultaneously when the first switch (2) selects the manual mode in the state where the second switch (5.6) has been fixed in the ON state due to malfunction or misoperation of the second switch (5, 6).

11 Claims, 14 Drawing Sheets

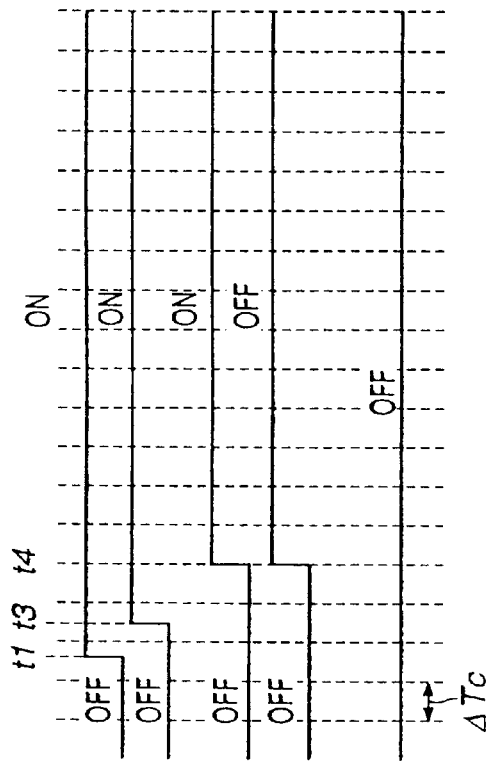
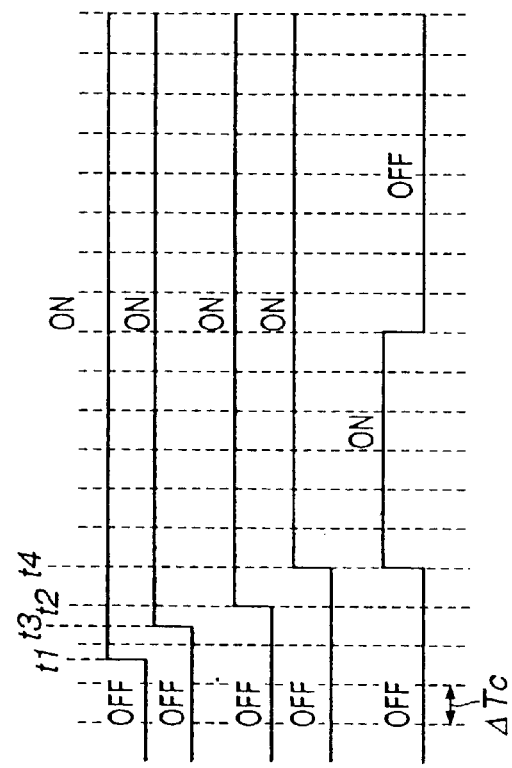
FIG. 3A  Mon
FIG. 3B  Sup
FIG. 3C  MF
FIG. 3D  SWSF
FIG. 3E  UPSHIFT COMMAND
FIG. 4A (PRIOR ART)  Mon
FIG. 4B (PRIOR ART)  Sup
FIG. 4C (PRIOR ART)  RECOGNITION OF Mon
FIG. 4D (PRIOR ART)  RECOGNITION OF Sup
FIG. 4E (PRIOR ART)  UPSHIFT COMMAND

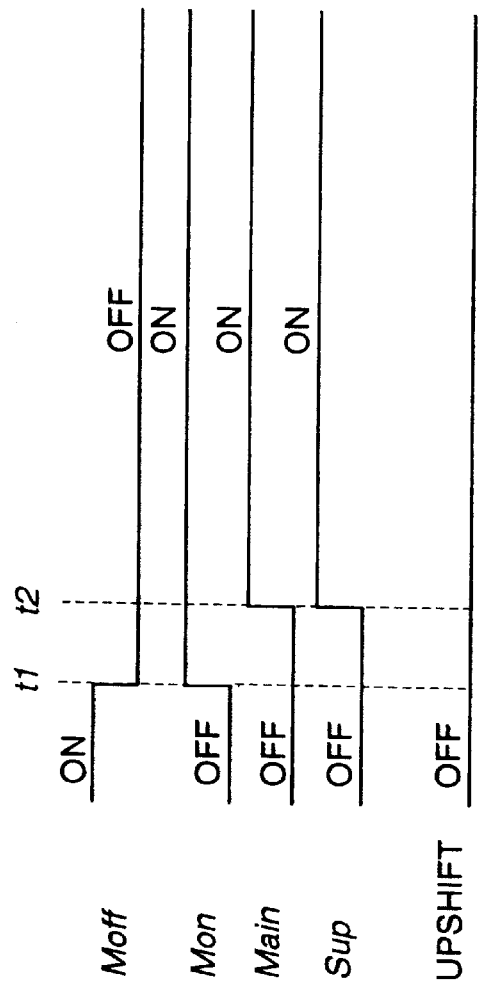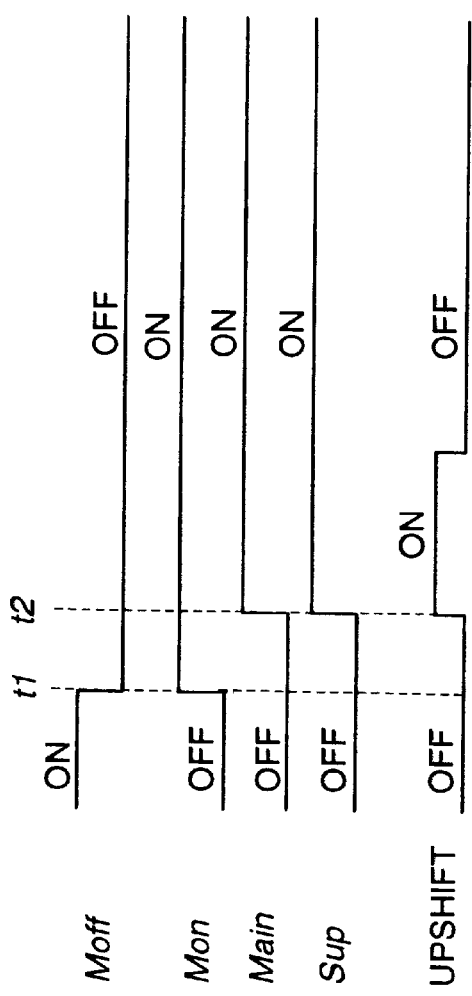

| SIGNALS | | | | | | FLAGS | | | |
|---|---|---|---|---|---|---|---|---|---|
| Moff | Mon | Lup | Ldown | Sup | Sdown | MANU | US | DS | GATE |
| OFF | OFF | OFF | ON | -- | -- | ON | OFF | ON | ON |
| | ON | ON | OFF | -- | -- | ON | ON | OFF | ON |
| | | OFF | OFF | OFF | OFF | ON | OFF | OFF | ON |
| | | | | OFF | ON | ON | OFF | ON | OFF |
| | | | | ON | OFF | ON | ON | OFF | OFF |
| | | | | ON | ON | ON | ON | ON | OFF |
| OFF | OFF | OFF | OFF | -- | -- | OFF | OFF | OFF | OFF |
| ON | OTHER COMBINATION | | | | | HOLD CURRENT SPEED RATIO | | | |

FIG. 10

| GATE | GATE$_{-1}$ | DS | US | DS$_{-1}$ | US$_{-1}$ | MANU$_{-1}$ = OFF | MANU$_{-1}$ = ON |
|---|---|---|---|---|---|---|---|
| ON | OFF | ON | OFF | -- | -- | INITIAL STATE | DOWNSHIFT |
| ON | OFF | OFF | ON | -- | -- | DO. | UPSHIFT |
| OFF | ON | ON | OFF | OFF | OFF | DO. | DOWNSHIFT |
| OFF | ON | OFF | ON | OFF | OFF | DO. | UPSHIFT |
| ON | ON | ON | -- | OFF | -- | DO. | DOWNSHIFT |
| ON | ON | -- | ON | -- | OFF | DO. | UPSHIFT |
| OTHER COMBINATION | | | | | | DO. | HOLD CURRENT SPEED RATIO |

FIG. 11

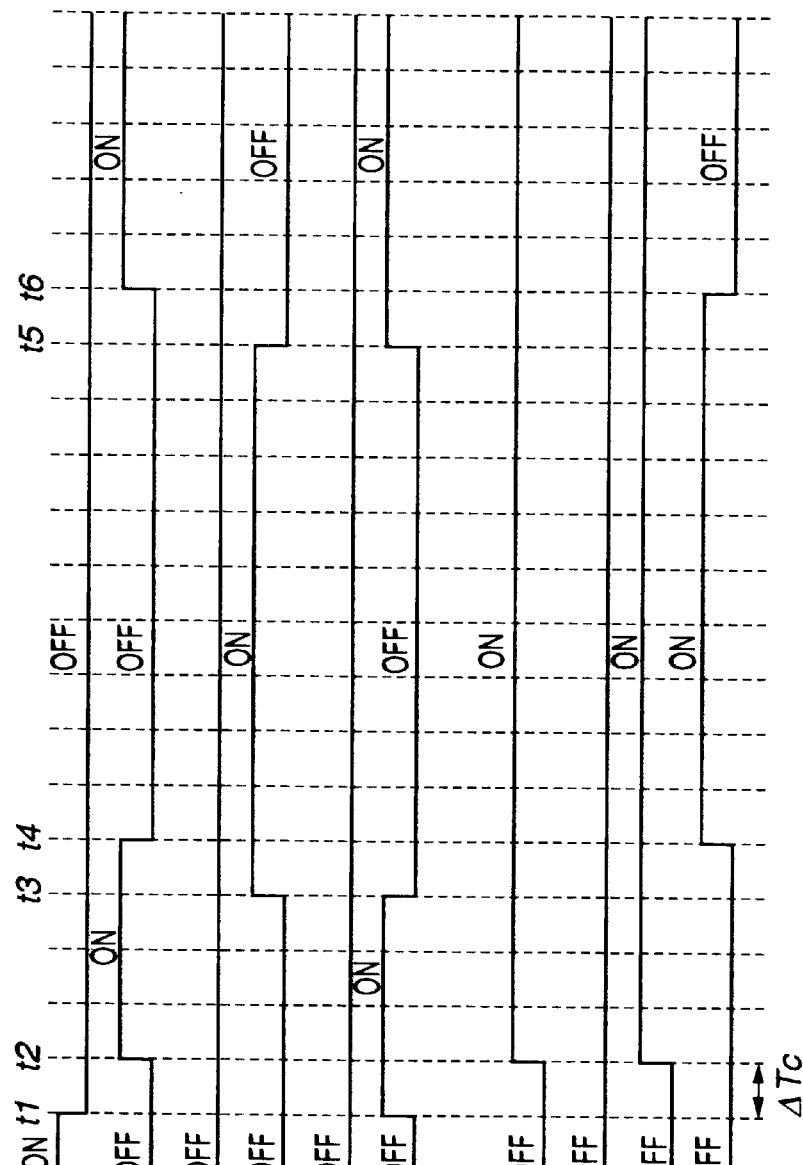

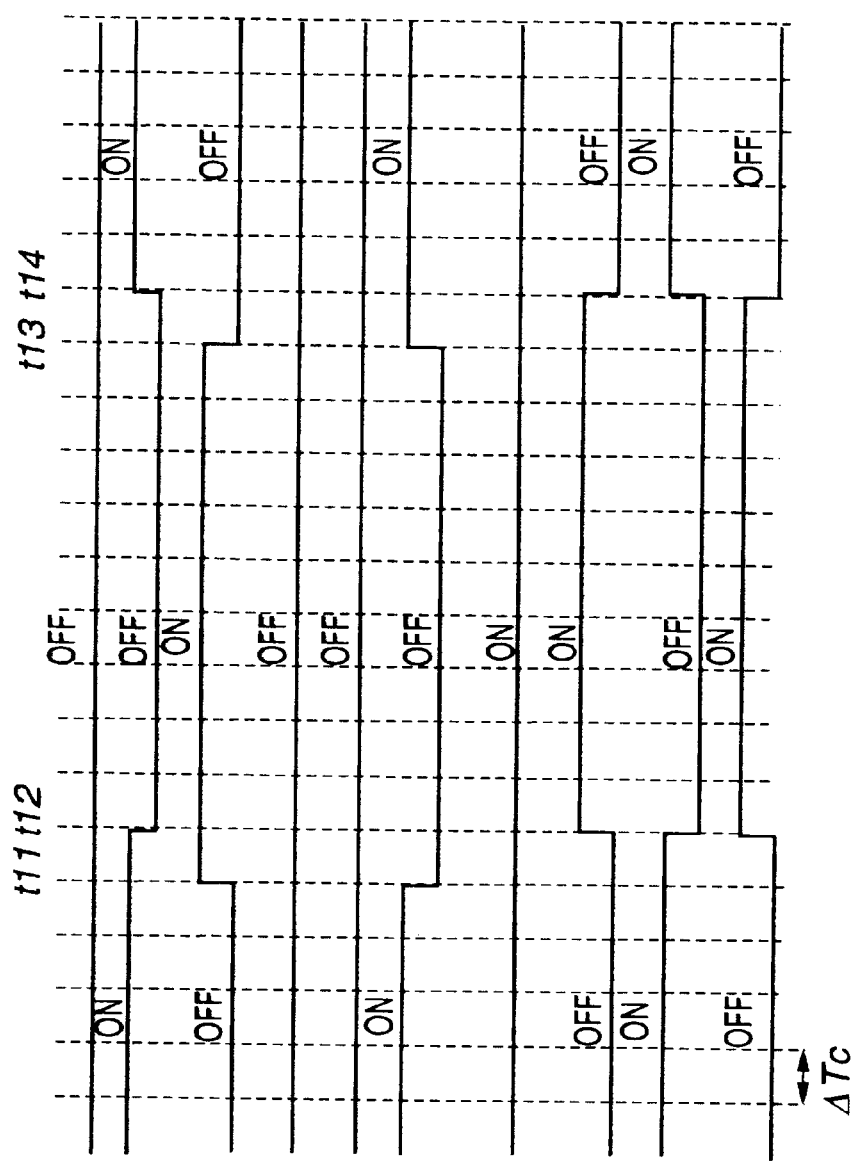

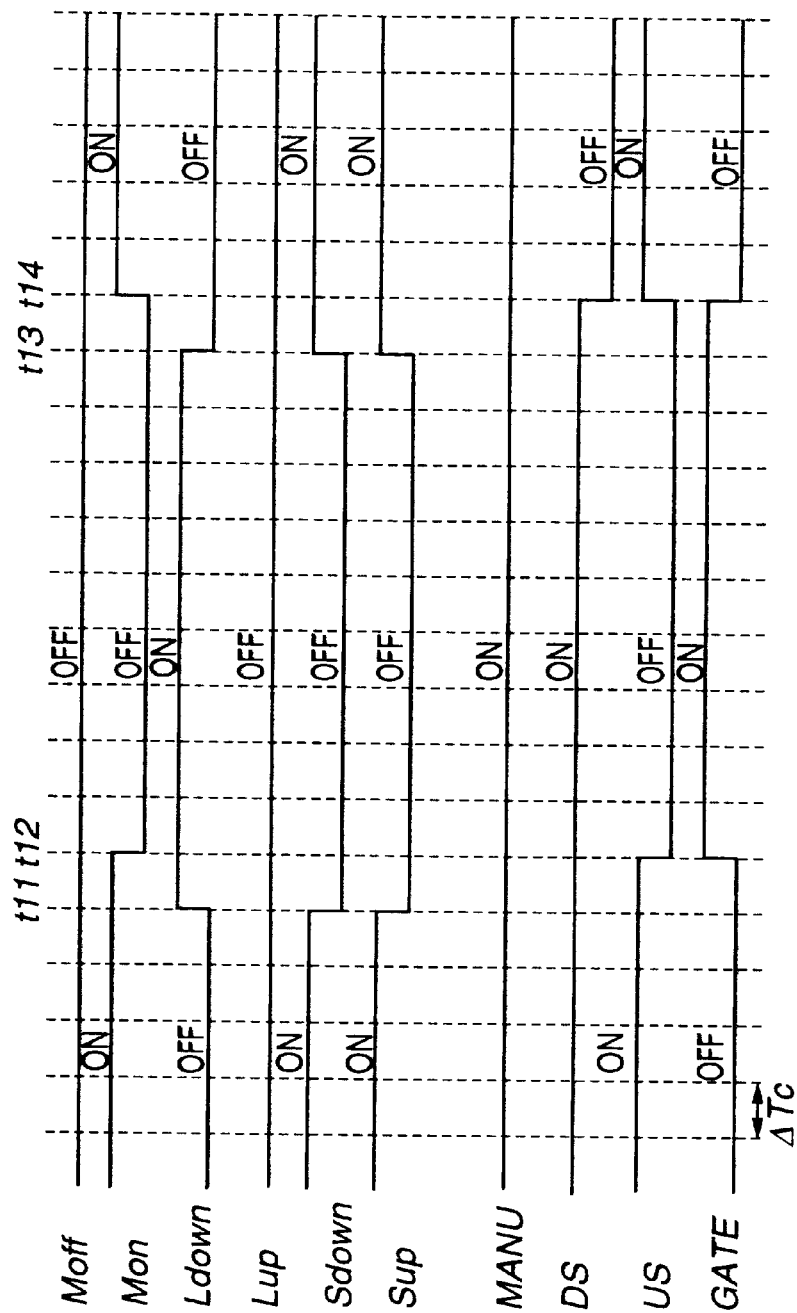

MANUAL OPERATION CONTROL OF AUTOMATIC TRANSMISSION

FIELD OF THE INVENTION

This invention relates to manual operation of an automatic transmission, and more specifically, relates to prevention of a speed-ratio variation due to malfunction or misoperation of a manual operation switch.

BACKGROUND OF THE INVENTION

Tokkai Hei 11-99840 published by the Japanese Patent Office in 1999 discloses a device enabling manual operation of an automatic transmission of a vehicle. In order to perform this operation, the vehicle is provided with a manual operation switch attached to a shift lever and a manual operation switch attached to the steering wheel.

The shift lever sets operation ranges such as a drive range, a reverse range, a neutral range and a manual range.

In a manual range, If the shift lever is moved in the upshift or the downshift direction, the manual operation switch with which the shift lever is provided outputs an upshift/downshift signal corresponding to the motion of the shift lever, and a controller changes the speed ratio of the automatic transmission according to this signal.

The same operation as that of the shift lever can be performed by operating the manual operation switch attached to the steering wheel.

By this mechanism, in a vehicle provided with an automatic transmission, the operating environment of a manual transmission can be simulated.

SUMMARY OF THE INVENTION

The manual operation switch provided to the shift lever or the manual operation switch provided to the steering wheel do not output an upshift/downshift signal if the shift lever is not located in the manual range.

However, If the manual operation switch attached to the steering wheel is fixed in a position corresponding to upshift or downshift due to a fault of the switch or a misoperation of a driver of the vehicle, an unintended speed ratio variation will occur immediately after the driver moves the shift lever to the manual range, and the driver will experience an uncomfortable feeling.

It is therefore an object of this invention to prevent an upshift or downshift unintended by the driver due a fault or misoperation of the manual operation switch.

It is another object of this invention to enable manual operation of the transmission via the manual operation switch attached to the shift lever when there is a malfunction of the manual operation switch attached to the steering wheel.

In order to achieve the above objects, a manual operation control device for an automatic transmission for a vehicle according to this invention comprises a first switch which can select a manual mode. a second switch which can specify one of an upshift or a downshift, and a microprocessor programmed to change a speed ratio of the automatic transmission according to a specification of the second switch when the first switch has first selected the manual mode, and the second switch subsequently specifies one of the upshift and the downshift and prohibit a variation of the speed ratio of the automatic transmission according to the specification of the second switch when one of the upshift and the downshift is specified by the second switch at a timing not later than a timing at which the manual mode is selected by the first switch.

This invention also provides a manual operation control method for an automatic transmission for a vehicle wherein the transmission is provided with a first switch which can select a manual mode and a second switch which can specify one of an upshift or a downshift. The method comprises changing a speed ratio of the automatic transmission according to a specification of the second switch when the first switch has first selected the manual mode, and the second switch subsequently specifies one of the upshift and the downshift, and prohibiting a variation of the speed ratio of the automatic transmission according to the specification of the second switch when one of the upshift and the downshift is specified by the second switch at a timing not later than a timing at which the manual mode is selected by the first switch.

The details as well as other features and advantages of this invention are set forth in the remainder of the specification and are shown in the accompanying drawings.

BRIEF DESCRIPTION OF THE DRAWINGS

FIGS. 3A–3E are timing charts describing a control of the automatic transmission in the manual mode by the transmission controller.

FIGS. 4A–4E are similar to FIGS. 3A–3E, but showing a speed ratio control by a conventional speed ratio control device.

FIGS. 8A–8E is a timing chart describing a control of the automatic transmission in the manual mode performed by the transmission controller according to the third embodiment of this invention.

FIGS. 9A–9E are similar to FIGS. 8A–8E. but showing a speed ratio control by the conventional speed ratio control device.

FIG. 10 is a table showing a relation between: signals input to and flags set by the transmission controller according to a fourth embodiment of this invention.

FIG. 11 is a table showing the details of a control of the automatic transmission performed based on the set flags by the transmission controller according to the fourth embodiment of this invention.

FIGS. 12A–12J are timing charts describing variations of signals and flags in the speed ratio control device according to the fourth embodiment of this invention, when an upshift switch attached to the steering wheel is fixed in the ON state, and an upshift is commanded by an upshift switch attached to the shift lever.

FIGS. 13A–13J are timing charts describing variations of signals and flags in the speed ratio control device according to the fourth embodiment of this invention, when the downshift switch attached to the steering wheel is fixed in the ON state, and a downshift is commanded by the downshift switch attached to the shift lever.

FIGS. 15A–15J are timing charts describing variations of signals and flags in the speed ratio control device according to the fourth embodiment of this Invention, when the upshift switch and downshift switch attached to the steering wheel are both in the ON state, and a downshift is commanded by the downshift switch attached to the shift lever.

DESCRIPTION OF THE PREFERRED EMBODIMENTS

Figure 1:
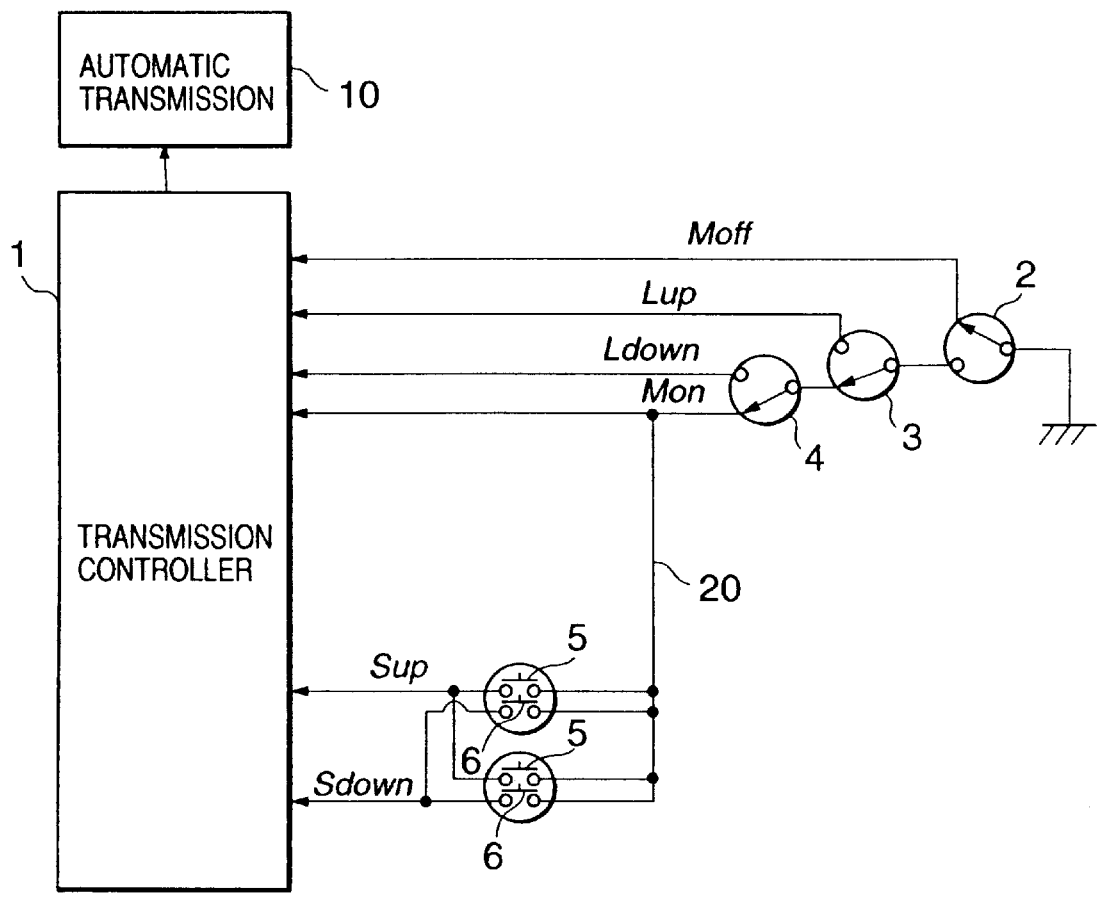
FIG. 1 is a schematic diagram of a control device of an automatic transmission equipped with manual operation switches according to this invention.

Referring to FIG. 1 of the drawings. a manual mode switch 2. upshift switch 3, downshift switch 4, upshift switch 5 and downshift switch 6 are connected to a transmission controller 1 of an automatic transmission 10 of a vehicle.

Here, the upshift switch 3 and downshift switch 4 are manual operation switches attached to the shift lever.

The upshift switch 5 and the downshift switch 6 are manual operation switches attached to the steering wheel.

Instead of attaching to me steering wheel itself, the upshift switch 5 and downshift switch 6 may be provided near me steering wheel.

A command signal specking upshifting, downshifting or holding is output to the automatic transmission 10 from the transmission controller 1, and the automatic transmission 10 changes the speed ratio according to the command signal. The automatic transmission 10 may be a continuously variable transmission that varies the speed ratio continuously or a conventional automatic transmission that applies one of several fixed speed ratios.

The manual mode switch 2 is a switch which determines whether the driver selects an automatic mode or a manual mode, and is installed near a driver's seat of the vehicle.

The upshift switch 3 and the downshift switch 4 output a signal which shows upshift or downshift according to whether the driver operates the shift lever in the upshift or downshift direction in the manual mode.

When the driver stops operating the shift lever, the manual mode switch 2 will be automatically returned to the OFF position as shown in FIG. 1.

In the normal state, the upshift switch 5 and the downshift switch 6 are both open as shown in FIG. 1. and a signal showing an upshift or a downshift is output by the closing operation of these switches.

The manual mode switch 2, upshift switch 3 and the downshift switch 4 are connected in series to the transmission controller 1.

The upshift switch 5 and the downshift switch 6 form a mutual parallel circuit.

The mutual parallel circuit is a circuit where one of the switches 5 or 6 is automatically turned OFF by turning the other of the switches 5 or 6 ON.

This mutual parallel circuit is connected via a circuit 20 to the signal OFF contact of the downshift switch 4 which is nearest the transmission controller 1 in this series circuit.

The output of the mutual parallel circuit is input to the transmission controller 1 as an upshift signal Sup and a downshift signal Sdown.

If the driver chooses an automatic mode, the manual mode switch 2 inputs a manual mode OFF signal Moff to me transmission controller 1. If the driver selects the manual mode, the output of the manual mode OFF signal Moff is stopped. As shown in me figure, if the manual mode switch 2 selects the manual mode, the upshift switch 3 outputs an upshift signal Lup each time there is an operation, and when no operation is performed, the switch is held In the position shown in the figure and the upshift signal Lup is not output.

Likewise regarding the downshift switch 4, if the manual mode switch 2 selects the manual mode, a downshift signal Ldown is output each time an operation is performed, and when an operation is not performed, the switch is held in the position shown in the figure and the downshift signal Ldown is not output.

If the manual mode switch 2 selects the manual mode and neither the upshift switch 3 nor the downshift switch 4 are operated, a manual mode ON signal Mon is input to the transmission controller 1 from the downshift switch 4.

When the driver selects the automatic mode, the manual mode switch 2 outputs a manual mode OFF signal to the transmission controller 1 as shown in the figure, and neither the upshift signal Lup nor the downshift signal Ldown is output to the transmission controller 1 even if the upshift switch 3 or downshift switch 4 is operated.

When the manual mode switch 2 selects the manual mode, provided that neither the upshift switch 3 and downshift switch 4 is operated i.e., provided that the manual mode ON signal Mon is output from the downshift switch 4, the upshift switch 5 and downshift switch 6 output an upshift signal Sup or a downshift signal Sdown to the transmission controller 1 according to the operation.

The transmission controller 1 comprises a microcomputer that has a central processing unit (CPU), read-only memory (ROM), random access memory (RAM) and Input/output interface (I/O interface).

The transmission controller 1 controls the automatic transmission 10 according to tie manual mode OFF signal Moff, manual mode ON signal Mon, upshift signal Lup, downshift signal Ldown, upshift signal Sup and downshift signal Sdown from the above circuits.

In the manual mode, even if one of the upshift signal Lup, downshift signal Ldown. upshift signal Sup and downshift signal Sdown continues to be in the ON state, the transmission controller 1 outputs a corresponding upshift command signal or a downshift command signal to the automatic transmission only once.

In order to perform upshift or downshift continuously, an ON/OFF operation of the corresponding switch must be performed plural times.

If the manual mode switch 2 selects the manual mode in the state where the upshift switch 5 or downshift switch 6 attached to the steering wheel is fixed in the ON state due to a fault or a misoperation, the following problem arises.

FIGS. 4A–4E show input signals, determination results and resultant operations when a transmission controller in which a conventional control routine is programmed reads the above signals and makes determinations based thereon. If the driver changes over the manual mode switch 2 from the automatic mode to the manual mode at a time t1 in the state where the upshift switch 5 is fixed in the ON state, firstly, the manual mode ON signal Mon is output to the transmission controller. To avoid an erroneous determination, the controller 1 determines that there has been a change-over of operation mode when the manual mode ON signal Mon is detected twice in succession with a time interval of ΔTc. This determination is referred to as to a two time check, Therefore, a change-over to the manual mode is detected at a time t2 which is equal to the time t1 plus ΔTc.

As the upshift switch 5 is fixed in the ON state, theoretically, the upshift signal Sup should be output at the time t1. However, due to the actual construction of the device, the upshift signal Sup is output at a time t3 later than the t1. As a result, the transmission controller 1 recognizes the upshift operation due to the upshift switch 5 at a time t4 after performing the two time check, and then immediately commands an upshift to the automatic transmission 10.

The upshift signal Sup is ON due to a fault or misoperation of the upshift switch 5. and not due to a driver's intentional operation. Therefore, the driver will probably experience an uncomfortable feeling due to an unintentional upshift operation of the automatic transmission 10 at the time t4.

Figure 2:
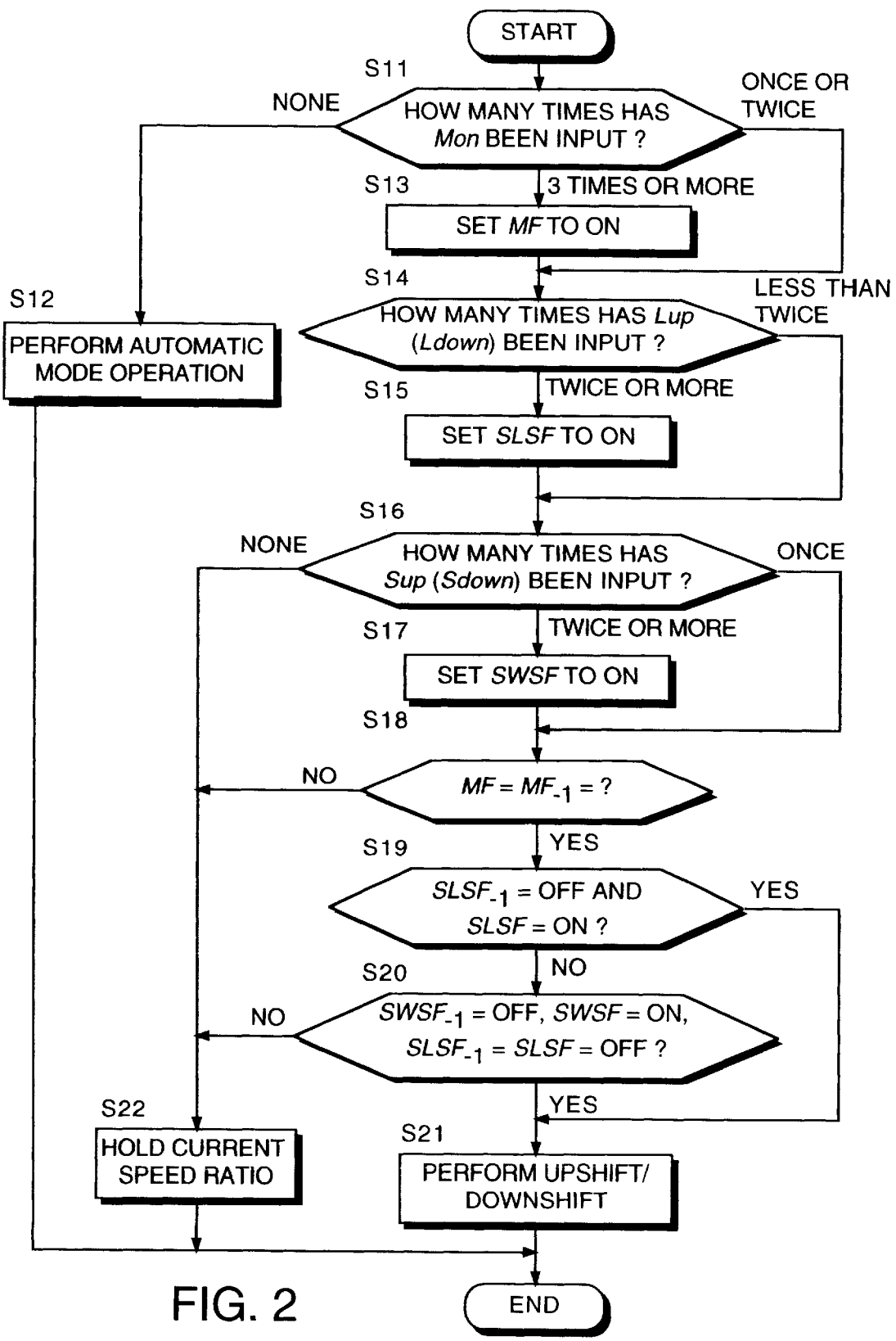
FIG. 2 is a flowchart describing a speed ratio control routine in a manual mode performed by a transmission controller according to this invention.

To resolve the above problem. the transmission controller 1 performs a speed ratio control routine shown in FIG. 2.

The essential feature of this routine is to detect an upshift or downshift operation not later than the detection of the manual mode even when the upshift signal Sup is delayed later than the manual mode ON signal Mon. In order to do so, determination of the manual mode is performed by a time check for three or more times requiring more time than the two time check. This routine is executed at an interval of 10 milliseconds. In other words, ΔTc=10 milliseconds. The transmission controller 1 reads signals from the switches shown In FIG. 1 each time this routine is executed.

First, in a step S11, the routine checks how many times the manual mode ON signal Mon has been input successively. When the manual mode ON signal Mon has been input zero times, it is certain that the current operation mode is not the manual mode. In this case, the routine performs speed ratio control in the automatic mode in a step S12. and the routine is terminated.

When it is determined that the manual mode ON signal Mon has been input once or twice in the step S11, the routine skips a step S13 and proceeds to a step S14.

When it is determined that the manual mode ON signal Mon has been input three times successively in the step S11, the routine sets a manual flag MF to ON in the step S13. This determination is referred to as a determination by a three time check of the manual mode ON signal Mon. After the processing of the step S13, the routine proceeds to the step S14.

In the step S14, it is determined how many times the upshift signal Lup or downshift signal Ldown has been input successively from the upshift switch 3 provided to the shift lever.

When it is determined that the upshift signal Lup or downshift signal Ldown has been input twice successively, the routine sets a shift lever switch flag SLSF to ON in a step S15, and proceeds to a step S16.

On the other hand, when it is determined that the number of successive inputs of the upshift signal Lup or downshift signal Ldown is less than two, the routine slips the step S15 and proceeds to the step S16.

In the step S16, it is determined how many times the upshift signal Sup or downshift signal Sdown has been input successively from the upshift switch 5 or downshift switch 6 attached to the steering wheel.

When it is determined that the upshift signal Sup or downshift signal Sdown has been input zero times, the routine proceeds to a step S22, a command signal is output to the automatic transmission 10 to hold the current speed ratio, and the routine is terminated.

When it is determined that the upshift signal Sup or downshift signal Sdown has been input twice successively, the routine sets a steering wheel switch flag SWSF to ON in a step S17, and proceeds to a step S18. This determination is referred to as a two time check of the steering wheel switch. On the other hand, when it is determined that the number of successive inputs of the upshift signal Sup or downshift signal Sdown is less than two, the routine skips the step S17 and proceeds to the step S18.

In the step S18. It is determined whether or not the manual flag MF is ON both during the immediately preceding occasion when the routine was executed and during the current routine. In the flowchart, the manual flag during the immediately preceding occasion when the routine was executed is represented by a symbol $MF_{-1}$.

When the determination result of the step S18 is affirmative, the routine proceeds to a step S19. On the other hand, when the determination result of the step S18 is negative, the routine proceeds to a step S22, the command signal is output to the automatic transmission 10 to hold the current speed ratio, and the routine is terminated.

In the step S19, it is determined whether or not the shift lever switch flag SLSF was OFF on the immediately preceding occasion when the routine was executed, and is ON during the current execution of the routine. In the flowchart, the shift lever switch flag during the immediately preceding occasion when the routine was executed is represented by a symbol $SLSF_{-1}$.

When the determination result of the step S19 is negative, the routine proceeds to a step S20. Here, it is determined whether or not the steering wheel switch flag SWSF and shift lever switch flag SLSF are both OFF during the immediately preceding execution of the routine, and only the steering wheel switch flag SWSF changes to ON during the current execution of the routine while the shift lever switch flag SLSF remains OFF. In the flowchart, the steering wheel switch flag during the immediately preceding occasion when the routine was executed is represented by a symbol $SWSF_{-1}$.

When the conditions of the step S20 are satisfied, the routine proceeds to a step S21. When the conditions of the step S20 are not satisfied, the routine proceeds to a step S22, the command signal is output to the automatic transmission 10 to hold the current value of the speed ratio, and the routine is terminated.

In the step S21, an upshift or downshift command is output to the automatic transmission based on the upshift signal Sup or downshift signal Sdown, and the routine is terminated.

Next, the control which is performed under the above routines will be described referring to FIGS. 3A–3E. The ting charts of FIGS. 3A–3E show the results of this control under the same conditions as those of FIGS. 4A–4E. Specifically, it applies to an automatic transmission wherein, even if the manual mode switch 2, and the upshift switch 5 or downshift switch 6 are simultaneously ON, the signal output of the upshift switch 5 or downshift switch 6 has a delay corresponding to the difference between the time t1 and t3 relative to the signal output of the manual mode switch 2.

When the driver changes over the manual mode switch 2 from the automatic mode to the manual mode at the time t1, the manual mode ON signal Mon is simultaneously output, and the transmission controller 1 performs a three time check of the manual mode ON signal Mon as shown in FIG. 3C in the step S11. As a result, at the time t4 to which a required determination time which is longer by one control period than FIG. 4C is added, the manual flag MF is changed over to ON.

On the other hand, as the upshift switch 5 is fixed in the ON state, the upshift signal Sup switches ON at the time t3 as shown in FIG. 3B. This is the same as in FIG. 4B.

The transmission controller 1 performs a two time check of this upshift signal Sup in the step S16, and sets the steering wheel switch flag SWSF to ON at the time t4 to which the required determination time is added.

Specifically, the manual flag MF and steering wheel switch flag SWSF change over to ON with the same timing.

In order to perform upshift operation in the step S21, the determination of the step S18 and that of the step S20 must be affirmative simultaneously, but if the manual flag MF and the steering wheel switch flag SWSF are changed over to ON with the same tinning, there is no chance that the determinations of both the step S18 and S20 will be affirmative. Consequently, the routine does not proceed to the step S21, and an upshift operation is not performed as shown in FIG. 3E. The same is true when the downshift switch 6 is fixed in the ON state.

Therefore, an upshift/downshift operation unintended by the driver is not performed.

Summarizing the above control, in a speed ratio controller wherein the output of the upshift signal Sup or downshift signal Sdown has a larger delay than the output of the manual mode OFF signal Moff, the signal determination timing of the transmission controller 1 is set to compensate this delay.

In this case, the timing with which the transmission controller 1 sets the steering wheel switch flag SWSF to ON may not be identical to the timing with which it sets the manual flag MF to ON. In other words, the delay may be compensated so that the setting of the steering wheel switch flag SWSF to ON is performed earlier than the setting of the manual flag MF to ON. With such a setting, when the manual mode switch 2 is changed over while the upshift switch 5 or downshift switch 6 is fixed in the ON state, the transmission controller 1 first changes the steering wheel switch flag SWSF to ON in the step S17. On the next or later occasions when the routine is executed, the manual flag MF is switched to ON in the step S13.

Since the steering wheel switch flag SWSF switches ON before the manual flag MF switches ON, the determination of the step S20 is always negative.

Therefore, the routine always proceeds from the step S20 to the step S22, and an upshift/downshift operation is not performed based on the upshift signal a Sup or downshift signal Sdown.

Next, the case will be considered where the upshift switch 3 or downshift switch 4 provided to the shift lever is fixed in the ON state.

A speed change based on the upshift switch 3 or downshift switch 4 is performed only when the determination of the step S18 and the determination of the step S19 are both affirmative.

In this routine, the determination of the manual mode in the step S11 is performed by a three time check. and the determination of the upshift signal Lup or downshift signal Ldown in the step S14 is performed by a two time check, so the manual flag MF and the shift lever switch flag SLSF are simultaneously ON. Consequently. the determination of the step S19 is always negative. Therefore, the routine always proceeds from the step S19 to the step S22, and an upshift/downshift operation based on the upshift signal Lup or downshift signal Ldown is not performed.

On the other hand, during normal operation. the manual mode switch 2 is changed over to the manual mode, and operation of one of the switches 3, 4, 5, 6 is then performed. In this case, the manual mode flag MF first switches ON and the shift lever switch flag SLSF or steering wheel switch flag SWSF switches ON afterwards, so the determination of the step S19 or step S20 is affirmative, and an upshift/downshift operation is performed in the step S21.

Further, according to this routine, even when the upshift switch 5 or downshift switch 6 attached to the steering wheel is fixed in the ON state, a manual operation of the automatic transmission 10 by the upshift switch 3 or downshift switch 4 attached to the shift lever can be performed. Likewise, even when the upshift switch 3 or downshift switch 4 is fixed in the ON state, a manual operation of the automatic transmission 10 by the upshift switch 5 or downshift switch 6 can be performed.

Next, a second embodiment of this invention will be described referring to FIG. 5.

In this embodiment, a main switch 7 is disposed in the circuit 20 connecting the series circuit comprising the manual mode switch 2, upshift switch 3 and downshift switch 4. and the mutual parallel circuit comprising the upshift switch 5 and downshift switch 6.

According to this embodiment, the manual operation of the automatic transmission 10 by the upshift switch 5 or downshift switch 6 is possible only when the main switch 7 is ON. However, if the main switch 7 is switched ON when the upshift switch 5 or downshift switch 6 is fixed in the ON state, an upshift or downshift unintended by the driver may be performed when the manual mode switch 2 is changed over to the manual mode.

However, such an upshift or downshift is prevented by the transmission controller 1 performing an identical routine to that of the first embodiment.

Next, a third embodiment of this invention will be described referring to FIGS. 6–9E.

Figure 5:
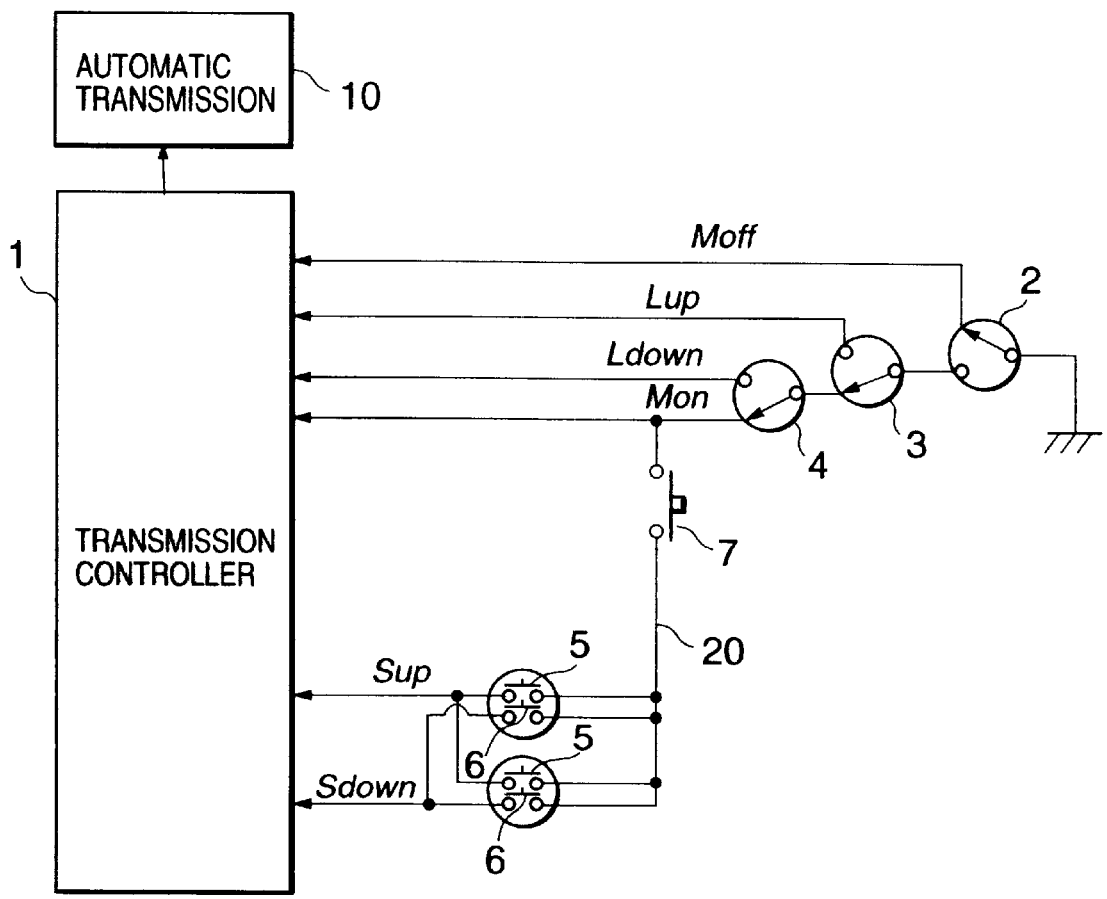
FIG. 5 is a schematic diagram of a speed ratio control device according to a second embodiment of this invention.
Figure 6:
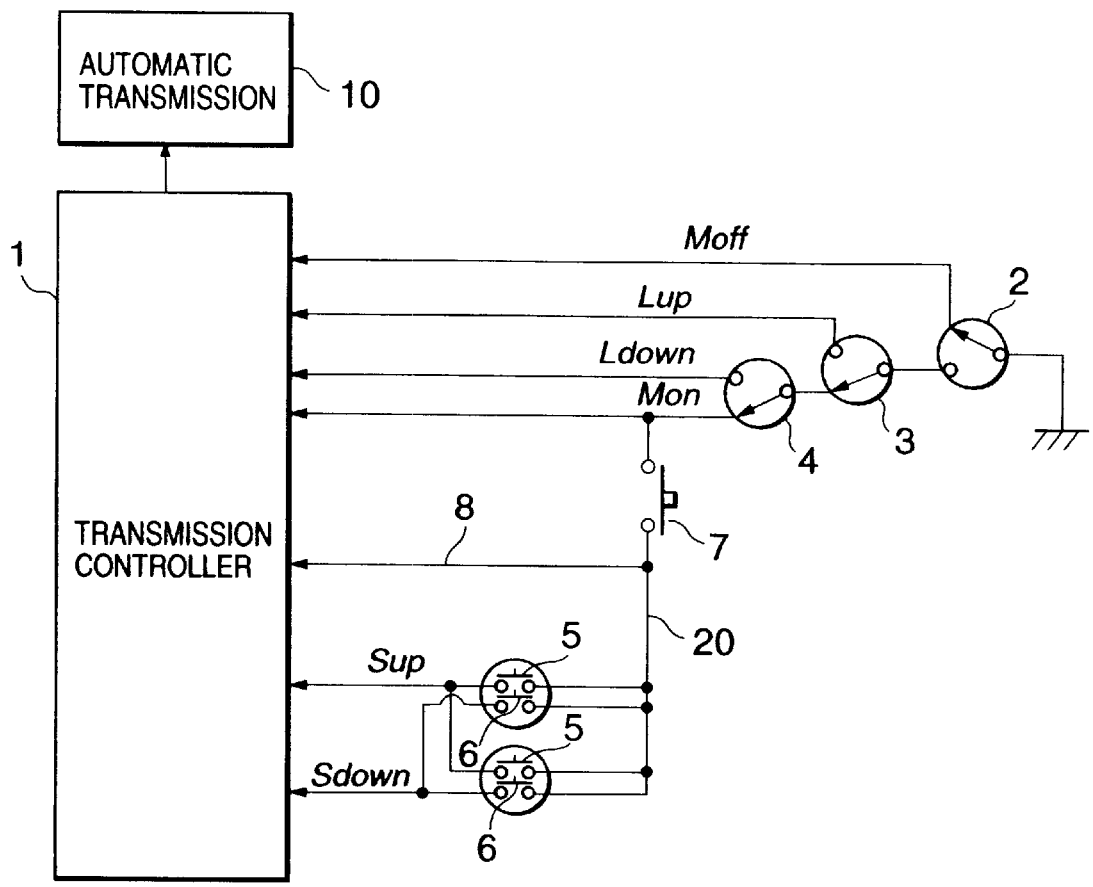
FIG. 6 is a schematic diagram of a speed ratio control device according to a third embodiment of this invention.

The device shown in FIG. 6 comprises a main switch signal input circuit 8 which inputs a signal Main according to ON/OFF of the main switch 7 of FIG. 5 to the transmission controller 1. The remaining features of the hardware are identical to those of the second embodiment.

Figure 7:
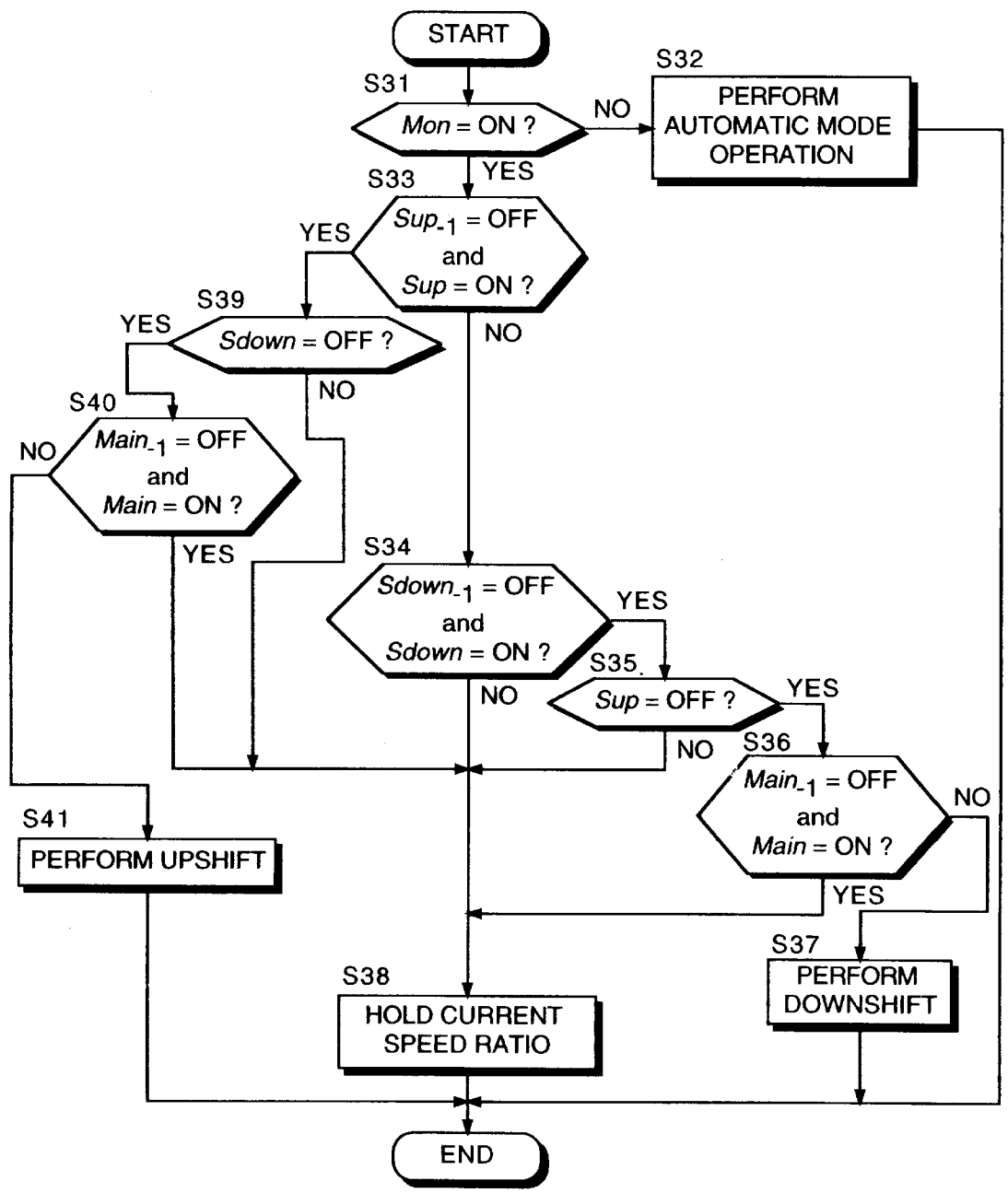
FIG. 7 is a flowchart describing a speed ratio control routine in the manual mode performed by a transmission controller according to the third embodiment of this invention.
Figures 14A, 14B, 14C, 14D, 14E, 14F, 14G, 14H, 14I, 14J:
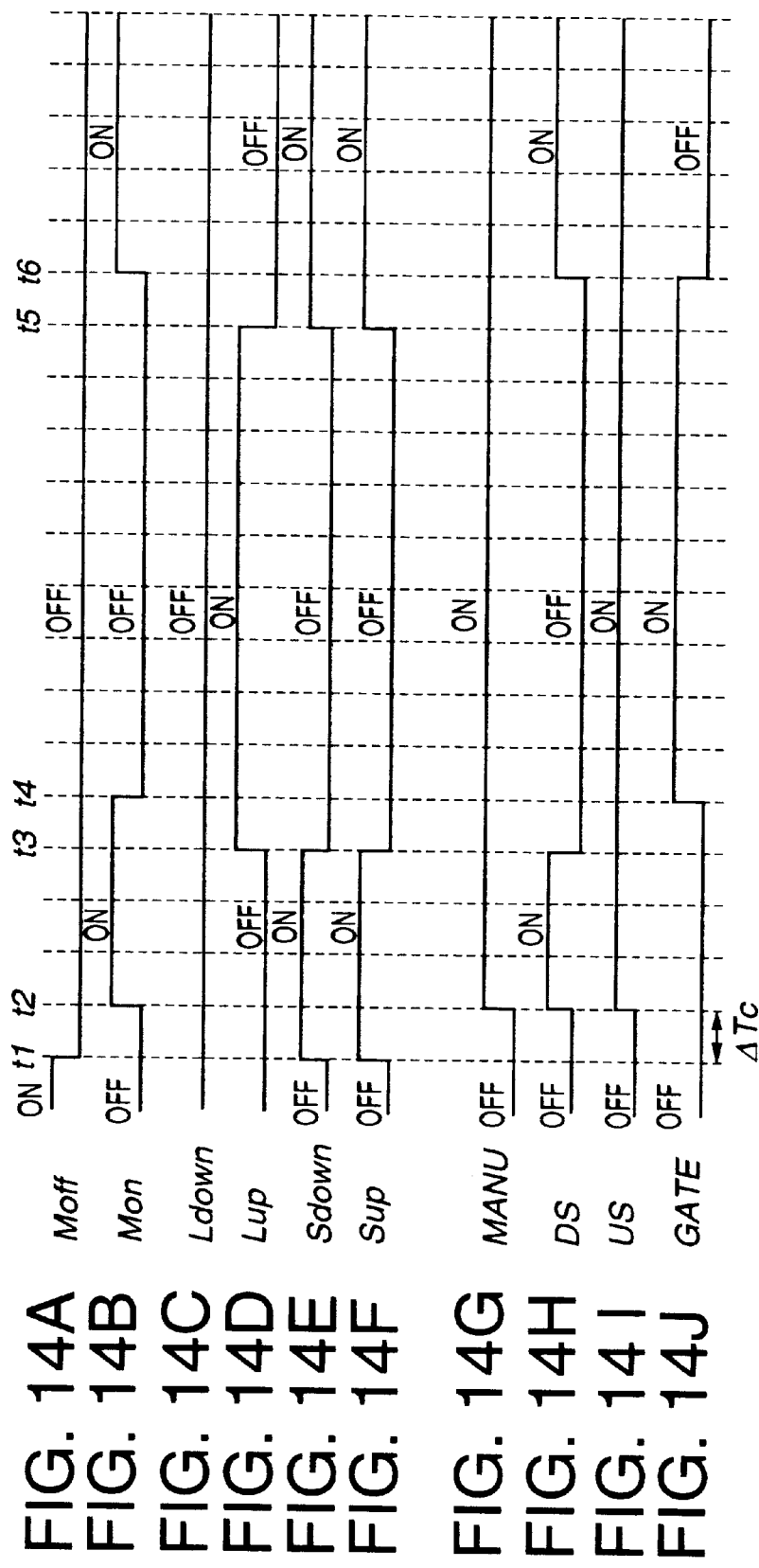
FIGS. 14A–14J are tuning charts describing variations of signals and flags in the speed ratio control device according to the fourth embodiment of this invention, when the upshift switch and downshift switch attached to the steering wheel are both in the ON state, and an upshift is commanded by the upshift switch attached to the shift lever.

In this embodiment, the transmission controller 1 performs the transmission control routine shown in FIG. 7 so that an unintended upshift/downshift of the transmission 10 does not occur when the upshift switch 5 or downshift switch 6 is fixed in the ON state.

This routine is also performed at an interval of 10 milliseconds.

First, in a step S31, the routine determines whether or not the manual mode ON signal Mon is ON. When the manual mode ON signal Mon is OFF, the routine performs the operation of the automatic transmission 10 in the automatic mode in a step S32, and the routine is terminated.

When the manual mode ON signal Mon is ON, the routine determines, in a step S33, whether or not the upshift signal Sup has changed from OFF to ON. In other words, it determines whether or not the upshift signal $Sup_{-1}$ was OFF, and Sup is ON as shown in the flowchart. Herein, Sup denotes the upshift signal on the present occasion when the routine is executed, and $Sup_{-1}$ denotes the upshift signal on the immediately preceding occasion the routine was executed.

When the determination result is affirmative, the routine proceeds to a step S39.

In the step S39, it is determined whether or not the downshift signal Sdown is OFF. When the downshift signal Sdown is ON, the upshift signal Sup and downshift signal Sdown are both in the ON state. In this case, a command which holds the current speed ratio is output to the automatic transmission in a step S38, and the routine is terminated.

In the step S39, when the downshift signal Sdown is OFF, the routine proceeds to a step S40. and it is determined whether or not the main switch signal Main input from the main switch signal input circuit 8 has changed over from OFF to ON. In other words, it is determined whether or not the main switch signal Main was OFF on the immediately preceding occasion routine was executed, and is ON on the present occasion when the routine is executed.

In the, flowchart, the main switch signal on the immediately preceding occasion routine was executed is represented by a symbol $Main_{-1}$.

The routine proceeds to the step S40 only when the upshift signal Sup changes from OFF to ON in the step S33. Therefore, the determination of the step 40 is affirmative only when the main switch 7 and upshift switch 5 have simultaneously changed to ON. This means that the upshift switch 5 was fixed in the ON state when the main switch 7 was switched on. In this case therefore, the routine proceeds to a step S38, a command signal to hold the current speed ratio is output to the automatic transmission 10, and the routine is terminated.

On the other hand, when the determination result of the step S40 is negative, the routine outputs an upshift command signal based on the upshift signal Sup to the automatic transmission 10 in a step S41, and the routine is terminated.

When the determination result of the step S40 is negative, logically, it means either that the ON state of the main switch 7 is continuing or that the main switch 7 is OFF. When the ON state of the main switch 7 is continuing, the main switch switches ON before the upshift signal Sup changes to ON in the determination of the step S33, and this corresponds to normal operation of the upshift switch 5. On the other hand, according to the hardware construction shown in FIG. 6, when the main switch 7 is OFF, the upshift switch 5 does not input a signal to the transmission controller 1. In this case therefore, the determination of the step S33 cannot be affirmative. As a result, it can effectively be determined whether or not the upshift switch 5 is fixed in the ON state by the determination of the step S40.

Now, when the determination result of the step S33 is negative, the routine proceeds to a step S34.

Steps S34–S37 are the steps which perform an identical processing for the downshift signal Sdown to that of the steps S33, S39–S41 relating to the upshift signal Sup.

First, in the step S34, it is determined whether not the downshift signal Sdown has changed from OFF to ON. When the downshift signal Sdown has changed from OFF to ON, the routine proceeds to the step S35.

In the step S35, it is determined whether or not the upshift signal Sup is OFF. When the upshift signal Sup is not OFF, it means that the downshift signal Sdown and upshift signal Sup are both ON. In this case, the routine outputs a command signal to hold the current speed ratio to the automatic transmission in the step S38, and the routine is terminated.

On the other land. when the upshift signal Sup is OFF in the step S35, the routine proceeds to the step S36, and it is determined whether or not the main switch signal Main has changed from OFF to ON.

When the routine proceeds to the step S35, the downshift signal Sdown is already ON, so when the main shift signal changes from OFF to ON in the step S36, it means that the downshift switch 6 is fixed in the ON state. In this case, the routine outputs a command signal to hold the current speed ratio to the automatic transmission in the step S38, and the routine is terminated.

According to the hardware construction shown in FIG. 6, when the main switch 7 is OFF, the downshift switch 6 does not input a signal to the transmission controller 1.

Therefore, the routine proceeds to the step S36 when the main switch 7 has changed from OFF to ON, or when the ON state is continuing.

When the determination of the step S35 is negative, it indicates a normal operation wherein the main switch signal Main switches ON before the downshift signal Sdown changes to ON. In this case, the routine outputs an upshift command signal based on the downshift signal Sdown to the automatic transmission 10 in the step S37, and the routine is terminated.

Next, the operation of the transmission under this transmission control will be described referring to FIGS. 8A–8E and FIGS. 9A–9E.

All the timing charts show the signal variations and operation of the transmission when the upshift switch 6 is fixed in the ON state and the main switch signal has changed to ON at the time t1.

FIGS. 9A–9E show the case of the speed ratio control device according to the prior art when the manual mode ON signal changes to ON, and the manual mode OFF signal changes to OFF, at the time t1. When the main switch signal switches ON at the time t2, electric current is supplied to the upshift switch 5 and downshift switch 6 provided to the steering wheel, and the upshift switch 5 which is fixed in the ON state outputs the upshift signal Sup to the transmission controller 1.

At this time, in the prior art device, as shown in FIG. 9E, the transmission controller 1 outputs an upshift command signal according to the upshift signal Sup to the automatic transmission 10, and the automatic transmission 10 performs an upshift. On the other hand, according to this routine, as the determinations of both the steps S33 and S40 are affirmative when the routine is executed, the routine outputs the command signal to hold the current speed ratio to the automatic transmission in the step S38, and the routine is terminated. Therefore, as shown in FIG. 8E, an upshift of the automatic transmission is not performed.

Above, the processing of the transmission controller 1 related to the signals Sup and Sdown from the upshift switch 5 and downshift switch 6 attached to the steering wheel, but an identical effect may be obtained by applying the same routine to the signals Lup, Ldown from the upshift switch 3 and downshift switch 4 attached to the shift lever switch.

Next, a fourth embodiment of this invention will be described referring to FIGS. 10–15J.

The hardware construction of this embodiment is identical to that of the first embodiment which does not have the main switch 7.

According to this embodiment, the transmission controller 1 respectively sets a manual mode flag MANU, upshift flag US, downshift flag DS and gate flag GATE according to the combination of the signals Moff, Mon, Lup, Ldown, Sup and Sdown described in the first embodiment as shown by the table of FIG. 10.

When the manual mode switch 2 selects the automatic mode, i.e., when tile manual mode OFF signal Moff is ON and the manual mode ON signal Mon is OFF, the manual flag MANU is reset to OFF, and in other cases it is set to ON.

The upshift flag US is set to ON when the upshift signal Lup or Sup is input, and is reset to OFF when none of these signals are input.

The downshift flag DS is set to ON when the upshift signal Ldown or Sdown is input, and is reset to OFF when none of these signals are input.

When the manual mode OFF signal Moff is OFF, and the manual mode ON signal is also OFF, i.e., in the manual mode, when the upshift switch 3 or downshift switch 4 attached to the shift lever is operated, the gate flag GATE is set to ON. It is also set to ON in the manual mode when the upshift signals Sup, Lup and downshift signals Sdown, Ldown are all OFF. In all other cases, i.e., in the manual mode when the upshift signal Sup or downshift signal Sdown is input and in the automatic mode, it is reset to OFF, The Initial values of the aforesaid flags MANU, US. DS, GATE are all OFF.

Figure 16:
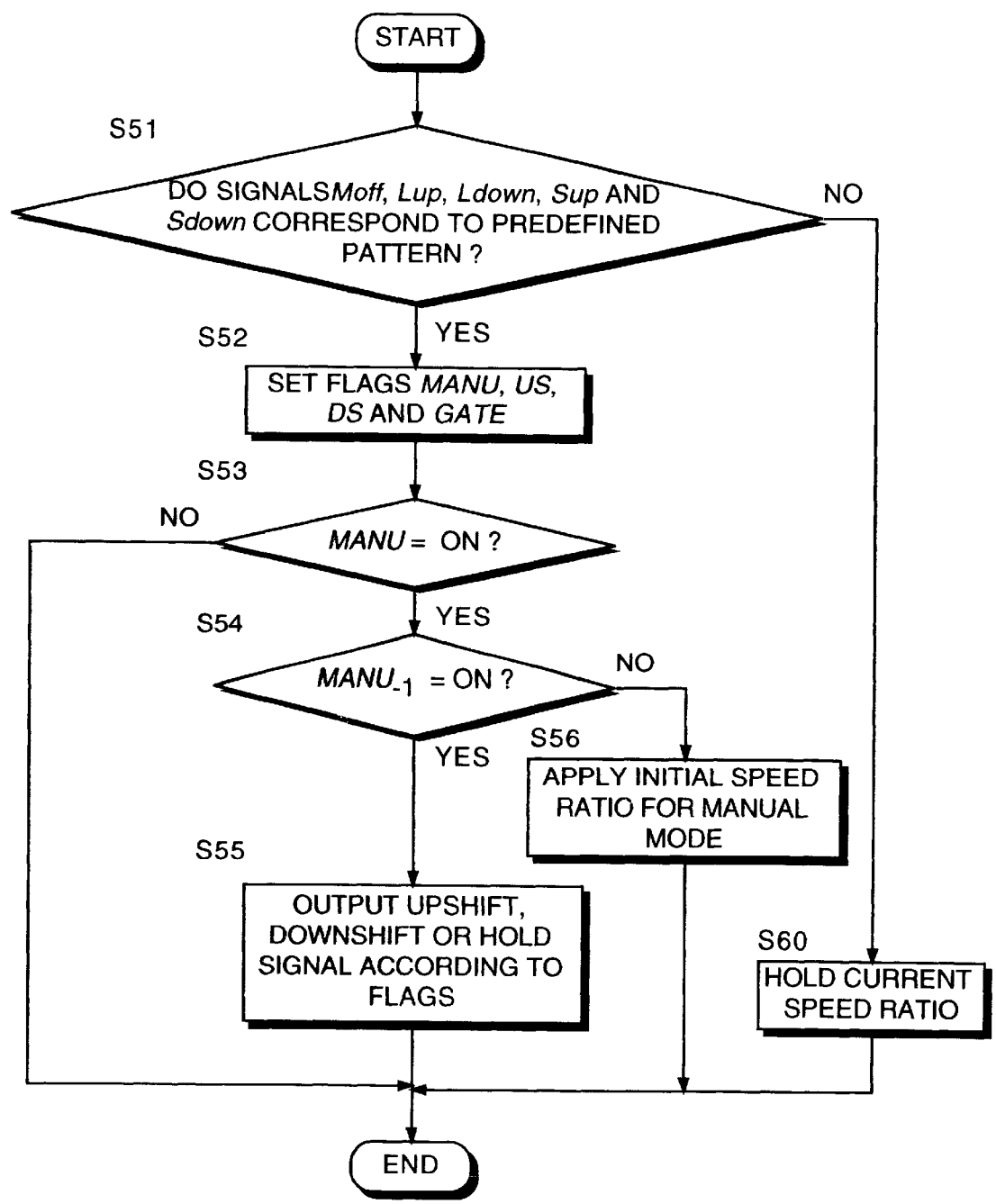
FIG. 16 is a flowchart describing a transmission control routine in the manual mode performed by the transmission controller according to the fourth embodiment of this invention.

Using these flags, the transmission controller 1 executes the speed change control routine shown in FIG. 16.

This routine is also performed at an interval of ten milliseconds.

First, in a step S51, the routine determines whether or not the input signals Moff, Mon, Lup, Ldown, Sup and Sdown coincide with any of the predetermined combination patterns shown in FIG. 10. When the input signals do not coincide with any of the patterns, a command signal is output to hold the current speed ratio to the automatic transmission 10 in a step S60, and the routine is terminated.

When the input signals coincide with one of the predetermined combination patterns, the routine proceeds to a step S52. Here, the manual mode flag MANU, upshift flag US, downshift flag DS and gate flag GATE are set by looking up a table in FIG. 10 based on the matching pattern.

In a next step S53, it is determined whether or not the manual flag MANU is ON. When the manual flag MANU is OFF, the routine is immediately terminated. When the manual flag MANU is ON, it is determined, in a following step S54, whether or not a manual flag $MANU_{-1}$ is ON. When the manual flag $MANU_{-1}$ is OFF, a command signal applying an initial speed ratio of the manual mode is output to the automatic transmission 10 in a step S56, and the routine is terminated.

Here, the initial speed ratio in the manual mode will be described.

When the automatic transmission comprises a continuously variable transmission, in the automatic mode, a speed ratio corresponding to for example 4.5th speed in terms of a manual transmission, is applied. Since the manual mode effectively simulates a manual transmission environment, plural fixed speed ratios which correspond to first, second, third, fourth and fifth speeds of a manual transmission, for example, are selectively applied. Now, when the manual mode switch 2 is changed over from the automatic mode to the manual mode, the fixed speed ratio nearest to the speed ratio applied in the automatic mode is selected as the initial speed ratio, and the automatic transmission 10 is controlled to this initial selected ratio.

That is, if 4.5th speed is applied in the automatic mode, the fourth speed is applied as the initial speed ratio when the operation mode is changed over from the automatic mode to the manual mode. Therefore, when the manual mode is selected in the control device for a continuously variable transmission, there is a chance of a slight downshift occurring simultaneously with the mode change-over. It should be noted that the object of this invention is not to prevent such a slight down shift but to prevent a large downshift from occurring by selecting the manual mode when the upshift switch 5 or downshift switch 6 are fixed in the ON state.

When the automatic transmission 10 is not a continuously variable transmission, but an automatic transmission where the speed ratio which is applied is automatically selected from plural fixed speed ratios, the speed ratio which was applied in the automatic mode is used as the initial speed ratio in the step S56.

Now, in the step S53, when the manual flag $MANU_{-1}$ is ON, the routine proceeds to a step S55.

In the step S55, the flags MANU, DS, US and GATE set in the step S52 and the flags $MANU_{-1}$, $DS_{-1}$, $US_{-1}$ AND $GAT_{-1}$ which were set on the immediately preceding occasion the routine was executed are compared by looking up a table in FIG. 11, and it is determined whether to apply a downshift or an upshift to the automatic transmission, or to hold the current speed ratio. A signal corresponding to the determination result is output to the automatic transmission 10, and the routine is terminated.

Next, referring to FIGS. 12A–12J, the operation of the automatic transmission 10 under this speed ratio control routine when the upshift switch 5 is fixed in the ON state and an operation of the manual mode switch 2 was performed, will be described.

The case will be considered when the upshift switch 5 is fixed in the ON state, the operation mode of the automatic transmission 10 is changed over to the manual mode due to an operation of the manual mode switch 2, and, further, the upshift signal Lup is input to the transmission controller 1 from the upshift switch 3 attached to the shift lever, Due to the operation of the manual mode switch 2, at a time t1, the manual mode OFF signal Moff is changed over from ON to OFF, and at a time t2, the manual mode ON signal Mon changes over from OFF to ON. In the state shown in FIG. 1, when the manual mode switch 2 changes over to the manual mode, input of the manual mode OFF signal Moff to the transmission controller 1 stops. At the same time, the manual mode ON signal Mon is input to the transmission controller 1 from the downshift switch 4 attached to the shift lever.

Due to the construction of the control device, change-over of the manual mode OFF signal Moff from ON to OFF at the time t1 is detected, and change-over of the manual mode ON signal Mon from OFF to ON at the time t2 which is when the next routine is performed, is detected.

The upshift signal Sup is also input at the time t1 to the transmission controller 1 from the upshift switch 5 which is fixed in the ON state. Therefore, at the time t1, the signals Moff, Mon, Lup, Ldown and Sdown are all OFF, and only the signal Sup is ON. In the step S51 of the routine which is performed at the time t1, this pattern does not coincide with any of the tables in FIG. 10. Therefore, a command signal which holds the current speed ratio is output to the automatic transmission 10 in a step S60, and the routine is terminated.

At the time t2. the manual mode ON signal Mon is ON. Therefore, in the routine which is executed at the time t2, the flags MANU and US are set to ON, and the flags DS and GATE are set to OFF, as shown in FIGS. 12G–12J. However, as the flag $MANU_{-1}$ is OFF, the routine proceeds from the step S54 to the step S56, and a command signal specifying the initial speed ratio is output to the automatic transmission 10.

On the next and subsequent occasions when the routine is executed, the flag $MANU_{-1}$ is ON, so the processing of the step S55 is performed. However, the flag GATE continues to be in the OFF state, so a command signal to hold the current speed ratio is output in the step S55.

Subsequently, the upshift switch 3 provided to the shift lever is operated, the upshift signal Lup is input to the transmission controller 1 at a time t3 as shown in FIG. 12D, and accordingly, the upshift signal Sup output from the upshift switch 5 fixed in the ON state switches OFF. However, the flag GATE remains OFF, so a command signal to hold the initial speed ratio is output in the step S55.

Due to the input of the upshift signal Lup at the time t3, a change-over of the manual mode ON signal Mon from ON to OFF at a time t4 when the next routine is performed, is detected.

As a result, in the routine performed at the time t4, the flags MANU. US and GATE are set ON, and the flag DS is set OFF as show,n in FIG. 10 in the step S52. Also, the flag $GATE_{-1}$ is OFF and the flag $MANU_{-1}$ is ON. In the table of FIG. 11, this condition corresponds to an upshift. Therefore, the routine output a command signal specifying an upshift to the automatic transmission 10 in the step S55.

After the time t4 until a time t5, the input signal does not change as shown in FIGS. 12A–12F. In the execution of the routine during this interval, the flags MANU, US and GATE are ON, and the flag DS remains OFF. The ON state of the flag US continues, so a command holding the current speed ratio is output each time to the automatic transmission in the step S55.

Hence, when the upshift switch 5 provided to the steering wheel is fixed in the ON state, the upshift signal Sup is ignored, so an unexpected shift-up is prevented. On the other hand, upshift of the automatic transmission 10 can still be performed by operating the upshift switch 3 attached to the shift lever.

When the upshift signal Lup from the upshift switch 3 switches OFF at the time t5, the upshift signal Sup again switches ON simultaneously. As a result, the signals Moff, Mon, Lup, Ldown and Sdown are all OFF.

In the step S52, when this routine is performed at the time t5, this pattern does not coincide with any of the tables in FIG. 10. Therefore, a command signal to hold the current speed ratio is output to the automatic transmission 10 in the step S60.

At a time t6 when the routine is next executed, due to the disappearance of the upshift signal Lup at the time t5, the manual mode ON signal Mon again changes over to ON. As a result, the signals Moff, Lup, Ldown and Sdown are all OFF, and the signals Mon, Sup switch ON. Therefore in the routine performed at the time t6, referring to FIG. 10 in the step S52, the fags MANU, US are set ON, and the flags DS, GATE are set OFF.

In describing the step S55, reference will be made to FIG. 11 based on these flags. Here, as the flag $US_{-1}$ is ON, the flag setting does not correspond to the pattern of FIG. 11, and the routine outputs a command signal to hold the speed ratio to the automatic transmission.

Therefore, when the operation of the upshift switch 3 is terminated, an upshift of the automatic transmission is not performed even when the upshift signal Sup switches ON again, and the automatic transmission 10 holds the speed ratio upshifted by the upshift switch 3 at the time t4.

Next, referring to FIGS. 13A–13J, the operation of the automatic transmission 10 under this control routine will be described when the downshift switch 4 is operated when the upshift switch 5 is fixed in the ON state.

Here, the manual mode switch 2 first selects the manual mode.

In this state, provided that the upshift switch 3 and downshift switch 4 are not operated, only the manual mode ON signal Mon and upshift signal Sup are ON, and other signals are OFF. From the table in FIG. 10, the routine which is performed in this state sets the flags MANU, US to ON, and the flags DS, GATE to OFF in the step S52. Provided that the flag GATE remains OFF, a command signal to hold the current speed ratio is always output to the automatic transmission 10 in the step S55.

When the downshift switch 4 provided to the shift lever is operated at a time t11, the downshift signal Ldown switches ON, and the upshift signal Sup switches OFF. This pattern does not coincide with any of the tables in FIG. 10, so a command signal is output to hold the current speed ratio to the automatic transmission 10 in the step S60.

Next, at a time 12, in connection with the operation of the downshift switch 4 at the time t11, the manual mode ON signal changes to OFF. As a result, the routine sets the flags MANU, DS and GATE to ON, and the flag US to OFF by looking up the table shown in FIG. 10. The flag $GATE_{-1}$ is OFF. This pattern corresponds to the downshift of FIG. 11. Therefore, the routine outputs a command signal specifying downshift to the automatic transmission 10 in the step S55.

On the next and subsequent occasions when the routine is executed, as the flags GATE and DS remained in the ON state, the routine outputs a command signal which holds the current speed ratio to the automatic transmission 10 in the same way as in the step S60. Therefore, after downshift is performed at a time t12, the automatic transmission holds the current speed ratio.

At a time t13, the downshift signal Ldown from the downshift switch 4 switches OFF, and the upshift signal Sup changes to ON as shown in FIG. 13E. As a result, only the signal Sup is ON while the other signals are all OFF, so the routine outputs a command signal to hold the current speed ratio to the automatic transmission 10 in the step S60 without changing the settings of the flags.

At a time t14, in connection with the change -over of the downshift switch Ldown to OFF at the time t13, the manual mode ON signal Mon again changes over to ON. As a result, the signals Moff, Ldown, Lup, Sdown are OFF, and the signals Mon, Sup are ON. The routine sets the flags MANU, US to ON, and the flags DS, GATE to OFF by looking up FIG. 10 in the step S52. At this time, the flag $GATE_{-1}$ is ON, the flag $DS_{-1}$ is ON and the flag $US_{-1}$ is OFF. The setting of these flags does not correspond to the pattern of FIG. 11, and the routine outputs a command signal to hold the current speed ratio to the automatic transmission 10 in the step S60.

Hence, the automatic transmission 10 can perform a downshift if the downshift switch 4 is operated even when the upshift switch 5 is fixed in the ON state. Also, even if the upshift signal Sup is re-input when the operation of the downshift switch 4 is terminated, the automatic transmission 10 does not perform an upshift, but holds the speed ratio at its value when there was a downshift due to the operation of the downshift switch 4 at the time t12.

Next, referring to FIGS. 14A–14J, the operation of the automatic transmission 10 will be described in the case where, under this control routine, the manual mode switch 2 changes over to the manual mode when the upshift switch 5 and downshift switch 6 are both fixed in the ON state, and the upshift switch 3 is operated.

Due to operation of the manual mode switch 2, the manual mode OFF signal Moff changes from ON to OFF at the time t1, and the manual mode ON signal Mon changes over from OFF to ON at the time t2. On the other hand, when the manual mode OFF signal Moff changes from ON to OFF, the upshift signal Sup from the upshift switch 5 which was fixed in the ON state, and the downshift signal Sdown from the downshift switch 6 which was fixed in the ON state, are respectively input to the transmission controller 1.

Therefore, at the time t1, the signals Moff, Mon, Lap, Ldown are OFF, and the signals Sup, Sdown are ON. In the step S51 of the routine which is performed at the time t1, this pattern does not coincide with any of the patterns in the table of FIG. 10. Therefore, a command signal to hold the current speed ratio is output to the automatic transmission 10 in the step S60 and the routine is terminated.

At the time t2, the manual mode ON signal Mon is ON. In the routine performed at the time t2, the flags MANU, US, DS are set ON, and the flag GATE is set OFF in the step S52 as shown in FIGS. 14G–14J. As the flag MANU$_{-1}$ is OFF, the routine proceeds to the step S56 from the step S54, and a command signal applying the initial speed ratio is output to the automatic transmission 10.

On the next and subsequent occasions when the routine is executed, the flag MANU$_{-1}$ is ON, so the processing of the step S55 is performed. However, as the flag GATE remains in the OFF state, a command signal to hold the initial speed ratio is output in the step S55.

At the time t3, the upshift signal Lup is input to the transmission controller 1, and at the same time, the upshift signal Sup output from the upshift switch 5 and downshift signal Sdown output from the downshift switch 6 which were fixed In the ON state are OFF. However, the flag GATE remains OFF, so a command signal to hold the initial speed ratio is output in the step S55

In relation to the input of the upshift signal Lup at the time t3, a change-over of the manual mode ON signal Mon from ON to OFF is detected at the time t4 when the routine is next executed.

As a result, in the routine performed at the time t4, the flags MANU, US and GATE are set ON. and the flag DS is set OFF as shown in FIG. 10 in the step S52. Also, the flag GATE$_{-1}$ is OFF and the flag MANU$_{-1}$ is ON. This condition corresponds to an upshift in the table of FIG. 11. Therefore, the routine outputs a signal specifying an upshift to the automatic transmission 10 in tie step S55.

Subsequently, until the time t5, the flags do not change, and as the flag US remains in the ON state, a command signal to hold the current speed ratio is output on each occasion to the automatic transmission 10 in the step S55.

Therefore, when the upshift switch 5 and downshift switch 6 attached to the steering wheel are fixed In the ON state, the upshift signal Sup and downshift signal Sdown are both ignored, so an unexpected upshift/downshift of the automatic transmission 10 is prevented. On the other hand, an upshift of the automatic transmission 10 can be performed by operating the upshift switch 3 attached to the shift lever switch.

At the time t5, the upshift signal Lup switches OFF, and simultaneously, the upshift signal Sdown and downshift signal Sdown switch ON. Accordingly, the signals Moff, Mon, Lup and Ldown are OFF. In the step S52 of the routine which is performed at the time t5, this pattern does not coincide with any of the patterns in the table of FIG. 10. Therefore, a command signal to hold the current speed ratio is output to the automatic transmission 10 in the step S60.

At the time t6 when the routine is next performed, due to the disappearance of the upshift signal Lup at the time t5, the manual mode ON signal Mon again changes over to ON. As a result, the signals Moff, Lup and Ldown are OFF, and the signals Moff, Sup and Sdown are ON. The routine performed at the time t6 therefore sets the flags MANU, US and DS to ON and the flag GATE to OFF in the step S52.

In the step S55, FIG. 11 is looked up based on these flags. Here, as the flag US, DS are both ON, the setting of the flag does not correspond to the pattern of FIG. 11, and the routine outputs a command signal to hold the speed ratio to the automatic transmission 10. Therefore, when the operation of the upshift switch 8 is terminated, the speed ratio of the automatic transmission 10 does not vary even if the upshift signal Sdown and downshift signal Sdown switch ON again, and the automatic transmission 10 holds the speed ratio which was upshifted by the upshift switch 3 at the time t4.

Next, referring to FIGS. 15A–15J, the operation of the automatic transmission 10 under this control routine will be described in the case where the downshift switch 4 is operated when the upshift switch 5 and downshift switch 6 are both fixed in the ON state.

Here, the manual mode switch 2 first selects the manual mode.

In this state, provided the upshift switch 3 and downshift switch 4 are not operated, the manual mode ON signal Mon, an upshift signal Sdown and downshift signal Sdown are ON, and the manual mode OFF signal Moff, upshift signal Lup and downshift signal Ldown are OFF. The routine which is performed in this state sets the flags MANU, US and DS to ON and the flag GATE to OFF in the step S52 by the table in FIG. 10. Provided that the flag GATE remains OFF, a command signal to hold the current speed ratio is always output to the automatic transmission in the step S55.

When the downshift switch 4 attached to the shift lever is operated at the time t11, the downshift signal Ldown switches ON, and simultaneously, the upshift signal Sup and downshift signal Sdown switch OFF. This pattern does not coincide with any of the patterns in the table of FIG. 10, so the routine outputs a command signal to hold the current speed ratio to the automatic transmission 10 in the step S60.

Next, at the time t12, in connection with the operation of the downshift switch 4 at the time t11, the manual mode ON signal changes to OFF. As a result, the routine sets the flags MANU, DS and GATE to ON and the flag US to OFF by looking up the table in FIG. 10. The flag GATE$_{-1}$ is OFF. This pattern corresponds to the downshift of FIG. 11, so the routine outputs a signal specifying a downshift to the automatic transmission 10 in the step S55, On the next and subsequent occasions the routine is executed, the flags GATE and DS both remain in the ON state, so the routine outputs a command signal to hold the current speed ratio to the automatic transmission 10 in the step S60. Therefore, after a downshift is performed at the time t12, the automatic transmission holds the current speed ratio.

At the time t13, the downshift signal Ldown from the downshift switch 4 switches OFF, and the upshift signal Sup and downshift signal Sdown change to ON as shown in FIGS. 15E and 15F. As a result, all signals except the signals Sup, Sdown are OFF, and the routine outputs a command signal to hold the current speed ratio to the automatic transmission 10 in the step S60 without changing the settings of the flags.

At the time t14, in connection with the change-over of the downshift switch Ldown to OFF at the time t13, the manual mode ON signal Mon again changes to ON. As a result, the signals Mon, Sup and Sdown are ON, and the signals Moff, Lup and Ldown are OFF. The routine sets the flags MANU, US and DS to ON, and the flag GATE to OFF, by looking up FIG. 10 in the step S52. At this time, the flag $GATE_{-1}$ is ON, the flag $DS_{-1}$ is ON and the flag $US_{-1}$ is OFF. The sent of these flags do not correspond to the pattern of FIG. 11, so the routine outputs a command signal to hold the current speed ratio to the automatic transmission 10 in the step S60.

In this way, the automatic transmission 10 can perform a downshift when the downshift switch 4 is operated even if the upshift switch 5 and downshift switch 6 are both fixed in the ON state. The speed ratio of the automatic transmission 10 does not vary, and the speed ratio which was downshifted by the downshift switch 4 at the time t12 is maintained even if the upshift signal Sup and downshift signal Sdown switch ON again when the downshift operation of the downshift switch 4 is terminated.

In this embodiment, in the manual mode, if a signal is input from the upshift switch 3 or downshift switch 4 attached to the shift lever, an upshift or downshift is performed according to a signal from the upshift switch 3 or downshift switch 4 regardless of a signal from the upshift switch 5 or downshift switch 6 attached to the steering wheel. Therefore, even if rapid engine braking is required when the upshift switch 5 or downshift switch 6 are fixed in the ON state, a downshift can be performed by operating the downshift switch 3 attached to the shift lever.

The contents of Tokugan Hei 11-295654, with a filing date of Oct. 18, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, this invention may be applied to an automatic transmission comprising only the upshift switch 5 and downshift switch 6 without the upshift switch 3 and downshift switch 4. In this case, in the first embodiment for example, the steps S14, S15 and S19 are omitted, and the determination of the shift lever switch flag in the step S20 is omitted.

As the upshift switch 3 and downshift switch 4 are not present, manual control of the automatic transmission when the upshift switch 5 or downshift switch 6 are fixed in the ON state can no longer be performed, but the upshift switch 5 or downshift switch 6 fixed in the ON state due to a fault or a misoperation can be prevented from causing an unintended upshift or down Likewise, this invention may also be applied to an automatic transmission comprising only the upshift switch 3 and downshift switch 4 without the upshift switch 5 and downshift switch 6.

The embodiments of this invention in which an exclusive property or privilege is claimed are defined as follows:

What is claimed is:

1. A manual operation control device for an automatic transmission for a vehicle, comprising:

a first switch which can select a manual mode;
a second switch which can specify one of an upshift or a downshift; and
a microprocessor programmed to:
change a speed ratio of the automatic transmission according to a specification of the second switch when the first switch has first selected the manual mode, and the second switch subsequently specifies one of the upshift and the downshift: and
prohibit a variation of the speed ratio of the automatic transmission according to the specification of the second switch when one of the upshift and the downshift is specified by the second switch at a timing not later than a timing at which the manual mode is selected by the first switch.

2. A manual operation control device as defined in claim 1, wherein the microprocessor is further programmed to identify a selection of the manual mode by the first switch during a first determining period, and identify the specification of one of the upshift and the downshift by the second switch during a second determining period shorter than the first determining period.

3. A manual operation control device as defined in claim 2, wherein the second switch is configured such that the specification is effective only after the first switch has selected the manual mode.

4. A manual operation control device as defined in claim 1, wherein the second switch comprises an upshift switch which specifies the upshift, and a downshift which specifies the downshift.

5. A manual operation control device as defined in claim 1, wherein the vehicle further comprises a shift lever and a steering wheel the first switch is attached to the shift lever, and the second switch is attached to the steering wheel.

6. A manual operation control device as defined in claim 5, wherein the device further comprises a third switch attached to the shift lever which can specify one of the upshift and the downshift, and the microprocessor is further programmed to allow the variation of the speed ratio of the automatic transmission when the third switch has specified one of the upshift and the downshift even when a change of speed ratio of the automatic transmission according to the specification of the second switch is prohibited.

7. A manual operation control device as defined in claim 6, wherein the first switch is configured to output a first signal to the third switch when the first switch selects the manual mode, the third switch is configured to be able to specify one of the upshift and the downshift only when the first signal is input, and to output a second signal to the second switch when the third switch specifies neither of the upshift and the downshift upon input of the first signal, and the second switch is configured to be able to specify one of the upshift and the downshift only when the second signal is input.

8. A manual operation control device as defined in claim 1, when the device further comprises a circuit which outputs a first signal to the second switch when the first switch has selected the manual mode and a main switch which connects and disconnects the circuit, and the second switch is configured to be able to specify one of the upshift and the downshift only when the first signal is input.

9. A manual operation control device as deed in claim 8, wherein the device further comprises a sensor which detects that the first signal was input to the second switch and the microprocessor is further programmed to prohibit variation of the speed ratio of the automatic transmission according to the specification of the second switch when one of the upshift and the downshift by the second switch is specified at a timing not later than a timing at which the first signal was input to the second switch.

10. A manual operation control device for an automatic transmission for a vehicle, comprising:

first means for selecting a manual mode:

second means for specifying one of an upshift or a downshift;

means for changing a speed ratio of the automatic transmission according to a specification of the second means when the first means has first selected the manual mode, and the second means subsequently specifies one of the upshift and the downshift; and means for prohibiting a variation of the speed ratio of the automatic transmission according to the specification of the second means when one of the upshift and the downshift is specified by the second means at a timing not later than a timing at which the manual mode is selected by the first means.

11. A manual operation control method for an automatic transmission for a vehicle wherein the transmission is provided with a first switch which can select a manual mode and a second switch which can specify one of an upshift or a downshift, the method comprising:

changing a speed ratio of the automatic transmission according to a specification of the second switch when the first switch has first selected the manual mode, and the second switch subsequently specifies one of the upshift and the downshift; and prohibiting a variation of the speed ratio of the automatic transmission according to the specification of the second switch when one of the upshift and the downshift is specified by the second switch at a timing not later than a timing at which the manual mode is selected by the first switch.

\* \* \* \* \*